United States Patent [19]

Whitt

[11] 4,008,788

[45] Feb. 22, 1977

[54] LUBRICATION SYSTEM INCLUDING LUBRICANT-STORING DISCRETE FOAM PARTICLES

[75] Inventor: James A. Whitt, Fort Wayne, Ind.

[73] Assignee: General Electric Company, Fort Wayne, Ind.

[22] Filed: Jan. 24, 1975

[21] Appl. No.: 543,834

Related U.S. Application Data

[60] Division of Ser. No. 407,635, Oct. 18, 1973, Pat. No. 3,894,956, which is a continuation-in-part of Ser. No. 292,664, Sept. 27, 1972, abandoned.

[52] U.S. Cl. .............................. 184/12; 308/132; 252/14; 252/12.2
[51] Int. Cl.² .................................. F16N 13/22
[58] Field of Search ............. 184/12, 5, 1 D, 6.23, 184/16, 102; 308/132; 252/12.6, 14

[56] References Cited

UNITED STATES PATENTS

| | | | |
|---|---|---|---|
| 2,303,068 | 11/1942 | Schoenbaum | 252/28 |
| 2,960,371 | 11/1960 | Staak | 308/132 |
| 2,966,459 | 12/1960 | Abel | 252/14 |
| 2,979,779 | 4/1961 | Staak | 264/46.6 |
| 3,113,105 | 12/1963 | Slayter et al. | 252/13 |
| 3,147,216 | 9/1964 | Oemler | 210/40 |
| 3,184,272 | 5/1965 | Ridgway | 308/132 |
| 3,214,375 | 10/1965 | Berkeley | 252/14 |
| 3,434,765 | 3/1969 | Abel | 308/132 |
| 3,466,244 | 9/1969 | Abel | 252/14 |
| 3,480,547 | 11/1969 | Van Dyk | 252/12.6 |
| 3,657,125 | 4/1972 | Strickman | 210/40 |
| 3,770,627 | 11/1973 | Alquist et al. | 210/40 |
| 3,800,950 | 4/1974 | Hess et al. | 210/242 |
| 3,812,031 | 5/1974 | McCoy et al. | 210/30 |

*Primary Examiner*—Richard C. Pinkham
*Assistant Examiner*—William R. Browne
*Attorney, Agent, or Firm*—Joseph E. Papin

[57] ABSTRACT

In a lubrication system for an apparatus having a bearing assembly in a lubricant cavity therefor, there is provided means in the lubricant cavity for storing a liquid lubricant and for releasing it to effect a supply thereof to the bearing assembly, the storing and releasing means being generally constituted by a particulate mass of discrete, non-fibrous, multi-digited, resilient-type foam particles generally saturated with the liquid lubricant.

30 Claims, 12 Drawing Figures

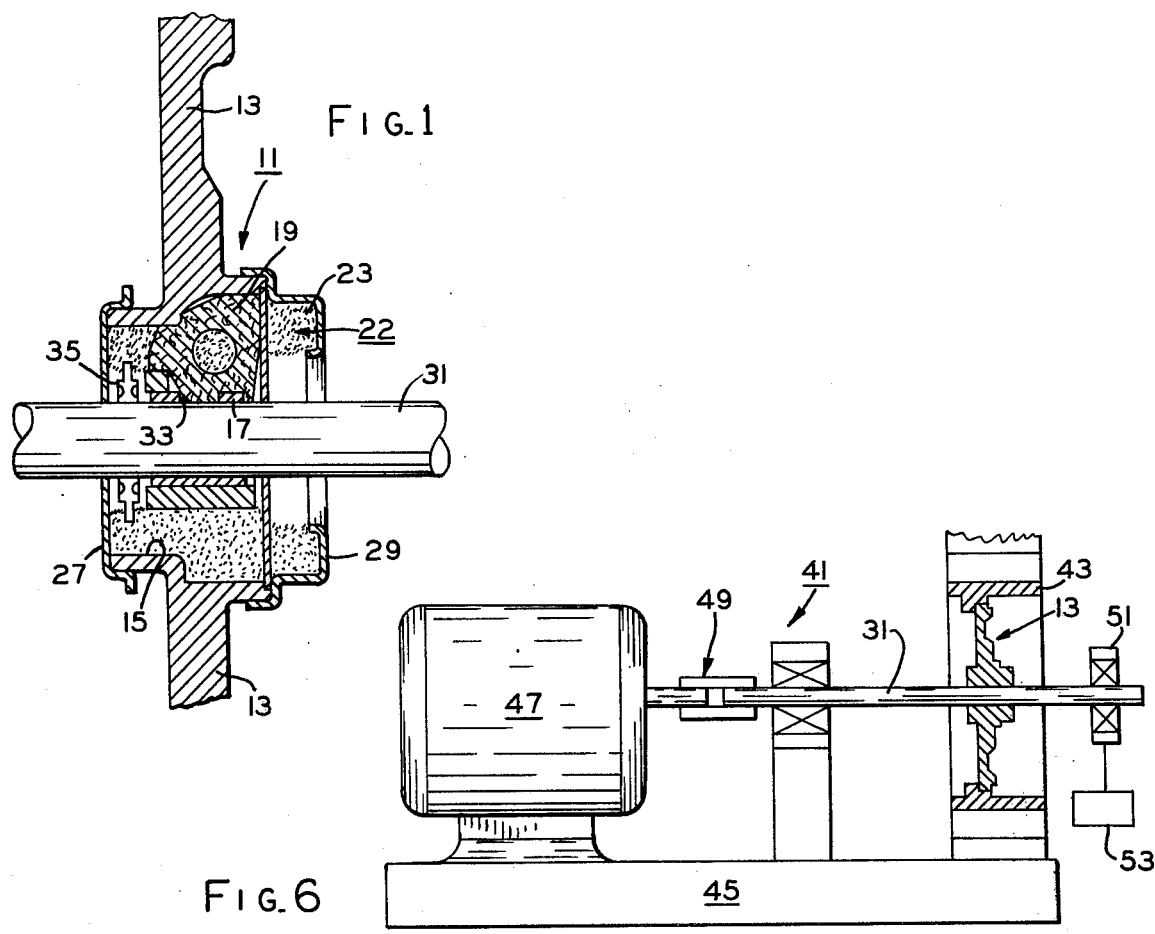
FIG. 1
FIG. 6
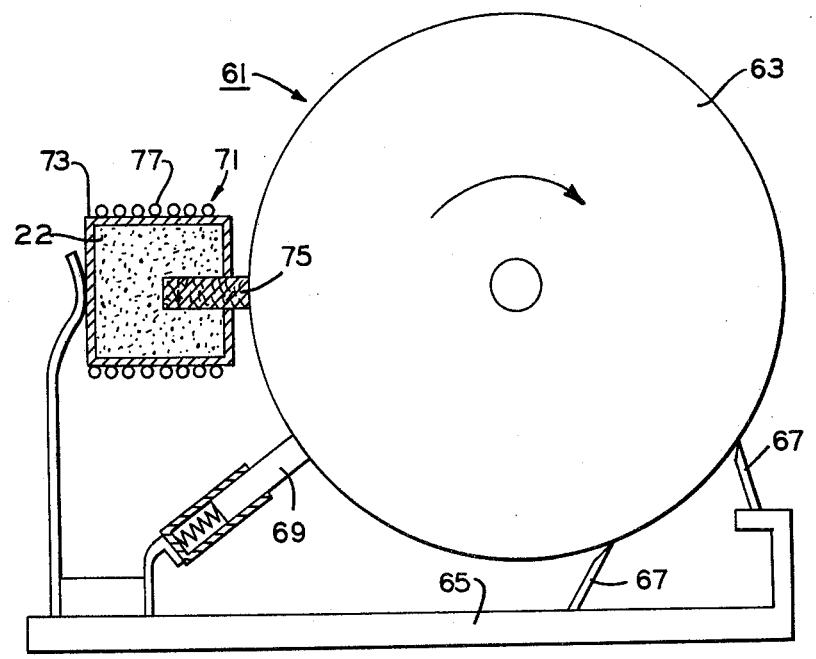
FIG. 7

LUBRICATION SYSTEM INCLUDING LUBRICANT-STORING DISCRETE FOAM PARTICLES

CROSS REFERENCE TO RELATED APPLICATIONS

This application is a division of my copending application Ser. No. 407,635 filed Oct. 18, 1973, now U.S. Pat. No. 3,894,956, which is a continuation-in-part of my copending application Ser. No. 292,664, filed Sept. 27, 1972, (now abandoned) which is specifically incorporated by reference herein.

FIELD OF THE INVENTION

This invention relates generally to lubrication systems for apparatus and in particular to a lubrication system utilizing, as a means for storing and releasing a liquid lubricant, a particulate mass of foam particle generally saturated with the liquid lubricant.

BACKGROUND OF THE INVENTION

In the past, lubrication systems utilizing various lubricant storage and releasing materials were well known in the art and commercially acceptable for use in lubricating various apparatus, such as electric motors for instance. The past known lubrication systems utilized commercially available lubricant storage and releasing materials which were composed of various fibrous materials, such as cellulose and synthetic fibers, including wood fibers, cotton fibers, nylon fibers, rayon fibers and the like. One form of past lubricant storage and releasing material, such as an oil impregnated, fibrous wicking material, is commercially available for a lubrication system under the trademark "PERMAWICK" from the Permawick Company of Detroit, Mich. U.S. Pat. No. 2,966,459, issued Dec. 27, 1960, to M. L. Able for "Material Having Oil Retaining Properties" describes a lubricant storage and releasing material for a lubrication system composed of cellulose fibers and a lubricating oil. The cellulose fibers, which form the oil absorbing part of the wicking material, are made from wood fibers and a mixture of paper-containing fibers of wood, cotton and the like. U.S. Pat. No. 3,214,375, issued Oct. 26, 1965 to B. Berkeley for "Lubricated Wicking Material" discloses an oil impregnated storage and releasing material for a lubrication system composed of a blend of cellulose and synthetic fibers, such as nylon or rayon fibers. The cellulose fibers are described as being coated, at least in part, with a coating of polyvinyl alcohol. U.S. Pat. No. 3,466,244, issued Sept. 9, 1969 to M. L. Abel for "Oil-Impregnated Wicking Material" describes a lubricant storage and releasing material for a lubrication system of oil impregnated cotton linter fibers. Each of the above three patents is assigned to the Permawick Company, and these patents describe commercially available Permawick extrudable lubricant storage and releasing material for a lubrication system which in each instance has a distinctly fibrous structure. It is believed that at least one of the disadvantageous features of these past lubrication systems was that they only had a capacity for releasing a minor portion of the liquid lubricant thereof.

U.S. Pat. No. 2,960,371, issued Nov. 15, 1960, to L. E. Staak for "Bearing Lubricating Structure" and U.S. Pat. No. 2,979,779, issued Apr. 18, 1961 to L. E. Staak for "Improved Method of Providing a Bearing Lubricating Structure" both describe a lubrication system which comprises an oil impregnated lubricating structure formed by foaming an epoxy or phenolic material in place directly in a bearing housing thereby to form a unitary cellular foam structure in the bearing housing. After the foam is formed in place in the bearing housing, the foam is impregnated with an appropriate lubricating oil.

The use of fibers of glass, asbestos, and the like as fillers in a lubrication system is also known in the art. U.S. Pat. No. 2,303,068, issued Nov. 24, 1942 to G. H. Schoembaum for "Lubricant And Preparation Thereof" describes the use of asbestos fibers as a filler to form a viscous lubricating composition. U.S. Pat. No. 3,113,105, issued Dec. 3, 1963 to G. Slayter et al. describes a lubrication system utilizing silicone fluid lubricant incorporating short lengths of fibrous glass for use at high temperatures.

Various past lubricating systems for bearing structures of apparatus have employed felt feeder wicks. See, for example, U.S. Pat. No. 3,434,765, issued Mar. 25, 1969 to M. L. Abel for "Lubricating Bearing Assembly and Method of Marking Same", and U.S. Pat. No. 3,184,272, issued May 18, 1965 to A. J. Ridgway for "Lubricating Means for a Rotatable Device." In this type of lubrication system, it is desirable that the lubricant impregnated or storage and releasing material release the lubricating oil which it contains at a rate and in an amount sufficient to maintain a steady flow of lubricant through the felt wick to the rotating structure to be lubricated. It is believed that significant problem confronting the art with respect to the past lubrication systems resided in the disadvantageous feature that many of the lubricant compositions or extrudable lubricant storing and releasing materials, while capable of being extruded or otherwise packed into the bearing structure, were capable of releasing only a relatively small or minor portion of the total amount of lubricating oil contained therein. The smaller the releasable proportion of the liquid lubricant or oil, the shorter the life of the lubrication system, and hence of the bearing structure itself. Furthermore, the unreleased portion of the lubricant obviously was not available to perform the intended lubricating function.

SUMMARY OF THE INVENTION

Among the several objects of the present invention may be noted the provision of a lubrication system for an apparatus including means for storing and releasing a liquid lubricant for a bearing assembly of the apparatus which overcomes the disadvantageous or undesirable features of the past lubrication systems as discussed hereinabove, as well as others; the provision of such lubrication systems in which such storing and releasing means is a particulate mass of resilient-type foam particles saturated generally with the liquid lubricant; the provision of such lubrication system which exhibits an improved and increased liquid lubricant release capacity; the provision of such lubrication system which has a capacity of releasing at least a major portion of the liquid lubricant stored therein; the provision of such lubrication system having liquid lubricant release and transmission characteristics similar to those utilizing a conventional wool storage wicking material; the provision of such lubrication system having improved moisture resistance and which is resistant to leaching of the liquid lubricant thereof when subjected to a wet, moist or humid environment; and the provision of such lubrication system which exhibits a long and useful life in dry or humid atmospheres with minimum re-oiling requirements. Other objects and advantageous features of the present invention will be in part apparent and in part pointed out hereinafter.

In general, a lubrication system in one form of the invention is provided for an apparatus having a bearing assembly in a lubricant cavity therefore. In this lubrication system, means is provided in the lubricant cavity for storing a liquid lubricant and for releasing it to effect a supply thereof to the bearing assembly, the storage and releasing means being generally constituted by a particulate mass of discrete, non-fibrous, multi-digited, resilient-type foam particles generally saturated with the liquid lubricant.

Also in general and in one form of the invention, a lubrication system is provided for an apparatus, the apparatus having a lubricant cavity with a bearing assembly disposed therein and also having means for feeding a liquid lubricant supplied thereto the bearing assembly with the feeding means disposed in the lubrication cavity in association with the bearing assembly. In this lubrication system, means is disposed within the lubricant cavity in interfacing relation with the feeding means for storing the liquid lubricant and for releasing it to effect the supply thereof to the feeding means, and the storing and releasing means is constituted by a particulate mass of discrete, non-fibrous, multi-digited, resilient type foam particles generally saturated with the liquid lubricant.

Further in general, a lubrication system in one form of the invention is provided for an apparatus. The apparatus has a lubricant cavity with a bearing assembly therein adapted to journal a movable component of the apparatus and also has means for feeding a liquid lubricant supplied thereto to the bearing assembly and the movable component for lubricating it with the feeding means being disposed in the cavity in association with the bearing assembly and the movable component. In this lubrication system, means adapted to be extruded into the cavity is disposed in interfacing relation with the feeding means for storing the liquid lubricant and for releasing it to effect the supply thereof to the feeding means. The storing and releasing means is constituted by a particulate mass of discrete, non-fibrous, multi-digited, resilient-type polymer foam particles generally saturated with the liquid lubricant and having a capacity for releasing generally up to about 85% of the liquid lubricant stored therein to supply it to the feeding means, and a major portion of the polymer foam particles of the particulate mass has a range size generally between approximately 20-mesh and approximately 80-mesh with the remaining polymer foam particles of the particulate mass having sizes generally between about 5-mesh and about 200-mesh exclusively of the major portion range size.

Still further in general and in one form of the invention, a lubrication system is provided for an apparatus. The apparatus has a bearing assembly in a lubricant cavity therefor, wicking means in the cavity for storage of a liquid lubricant, and a fibrous type lubricant feeder wick disposed in the cavity in interfacing and lubricant transferring relation with both the bearing assembly and the wicking means. The improvement wherein the wicking means comprises a mass of liquid lubricant impregnated discrete, non-fibrous, multidigited, resilient foam particles having the capacity to transfer the liquid lubricant thereof to the feeder wick at a rate approximating that of the feeder wick so as to transfer the liquid lubricant to the bearing assembly.

DESCRIPTION OF THE DRAWINGS

FIG. 1 is a sectional view of a bearing cavity of an apparatus in which a lubricating system in one form of the invention is illustrated;

FIG. 6 is a diagrammatic representation of a reaction type dynamometer testing apparatus;

FIG. 7 is a diagrammatic representation of an oil release testing apparatus;

Corresponding reference characters indicate corresponding parts throughout the several views of the drawings.

Figure 2:
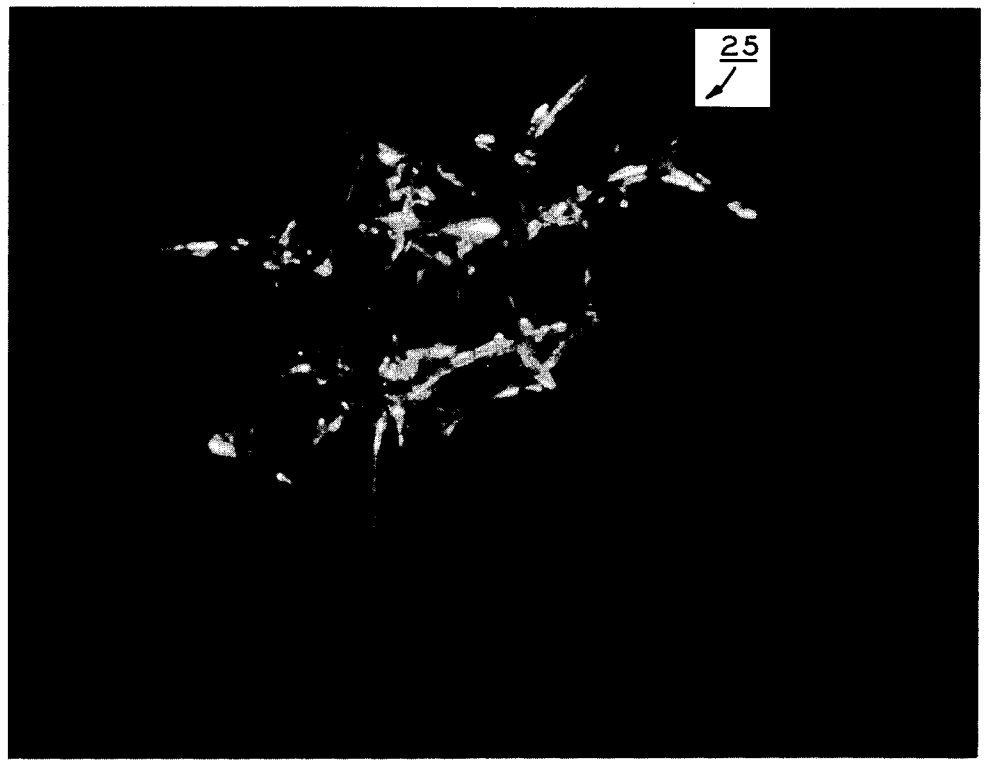
FIG. 2 is a photomicrograph of 40× magnification of polymer foam particles of the lubricating system having a size between about 20 and 35 mesh.

The exemplifications set out herein illustrate the preferred embodiment of the invention in one form thereof, and such exemplifications are not to be construed as limiting in any manner.

DETAILED DESCRIPTION OF THE PREFERRED EMBODIMENT

Referring now to the drawings in general, there is illustrated at 11 a lubrication system in one form of the invention (FIG. 1). Lubrication system 11 is provided for an apparatus 13 having a lubricant cavity 15 with a bearing assembly 17 disposed therein, and means, such as a felt feeder wick or the like 19, for feeding a liquid lubricant 21 (FIG. 3) supplied thereto to the bearing assembly is disposed in the lubricant cavity in association with the bearing assembly. In lubrication system 11, means, such as a lubricant composition indicated generally at 22, is disposed within lubricant cavity 15 in interfacing relation with feeding means or feeder wick 19 for storing liquid lubricant 21 and for releasing it to effect the supply thereof to the feeder wick, and the storing and releasing means or lubricant composition 22 is constituted by a particulate mass 23 of discrete, non-fibrous, multi-digited, resilient-type foam particles 25 generally saturated with the liquid lubricant (FIGS. 2–5).

More particularly and with specific reference to FIG. 1, apparatus 13 is shown for purposes of disclosure as an end frame or end shield for a dynamoelectric machine (not shown); however, it is contemplated that lubrication system 11 of this invention can be utilized in any suitable or adaptable apparatus having components requiring lubrication within the scope of the invention. End shield 13 together with an end cap 27 and an oil well or lubricant cavity cover 29 respectively attached thereto generally define lubricant cavity 15, and bearing assembly 17 is disposed or mounted in the lubricant cavity in a manner well known in the art. For purposes of disclosure, bearing assembly 17 is illustrated as a tin-babbitt metal sleeve bearing or the like, but it is contemplated that other types of bearings or bearing assemblies well known to the art may be employed in end shield 13 within the scope of the invention. A rotatable member or movable component, such as a shaft 31 of the dynamoelectric machine (not shown), is rotatably supported in end shield 13 and journaled in bearing assembly 17, and the shaft may also extend through end cap 27 and oil well cover 29. In order to transmit or feed liquid lubricant 21 to bearing assembly 17, an aperture or opening 33 is provided therein, and feeder wick 19 is conveniently mounted within lubricant cavity 15 so as to extend into the bearing assembly opening into rubbing or lubricating engagement with a peripheral or journaled surface of rotatable shaft 33. Means, such as an oil slinger or thrower 35, is mounted to shaft 12 for returning or slinging any liquid lubricant 21 which may flow from feeder wick 19 between bearing assembly 17 and shaft 31 back into storage in lubricant composition 22. Lubricant composition 22 which is constituted by a particulate mass 23 of foam particles 25 generally saturated or impregnated with liquid lubricant 17, as previously mentioned, is adapted to be extruded into lubricant cavity 15 by commercially available extruding apparatus, as is well known to the art, and it is also contemplated that the particulate mass may be packed by hand or otherwise placed in the lubricant cavity within the scope of the invention. When so placed in lubricant cavity 15, thereby to complete lubrication system 11 for apparatus 13, lubricant composition 22 is disposed in interfacing and liquid lubricant transmitting or supplying relation with feeder wick 19. In this manner, foam particles 25 of lubricant composition 22 may release liquid lubricant 21 contained therein to effect a supply or flow thereof directly to feeder wick 19 which, in turn, transmits the liquid lubricant supplied thereto to shaft 31 for lubricating it. As previously mentioned, any liquid lubricant 21 flowing from between bearing assembly 17 and shaft 31 is displaced back into storage in particulate mass 23 of foam particles 25 in lubrication system 11.

A preferred embodiment of the invention, as illustrated by lubrication system 11, is to utilize lubricant composition 22 in interfacing or lubricant transferring or supplying relation with feeder wick 19, as described above; however, in some lubrication systems, it is contemplated that the lubricant composition may be in direct lubricant relation or engagement with the apparatus component to be lubricated within the scope of the invention. As mentioned above, lubrication system 11 is not intended to be limited to any particular structural feature of the apparatus in which it is employed, and with regard to such different apparatus construction, reference may be had, for example, to those shown in U.S. Pat. Nos. 2,966,459, 3,434,765, 3,184,272 and 2,960,371 referred to above.

Figure 3:
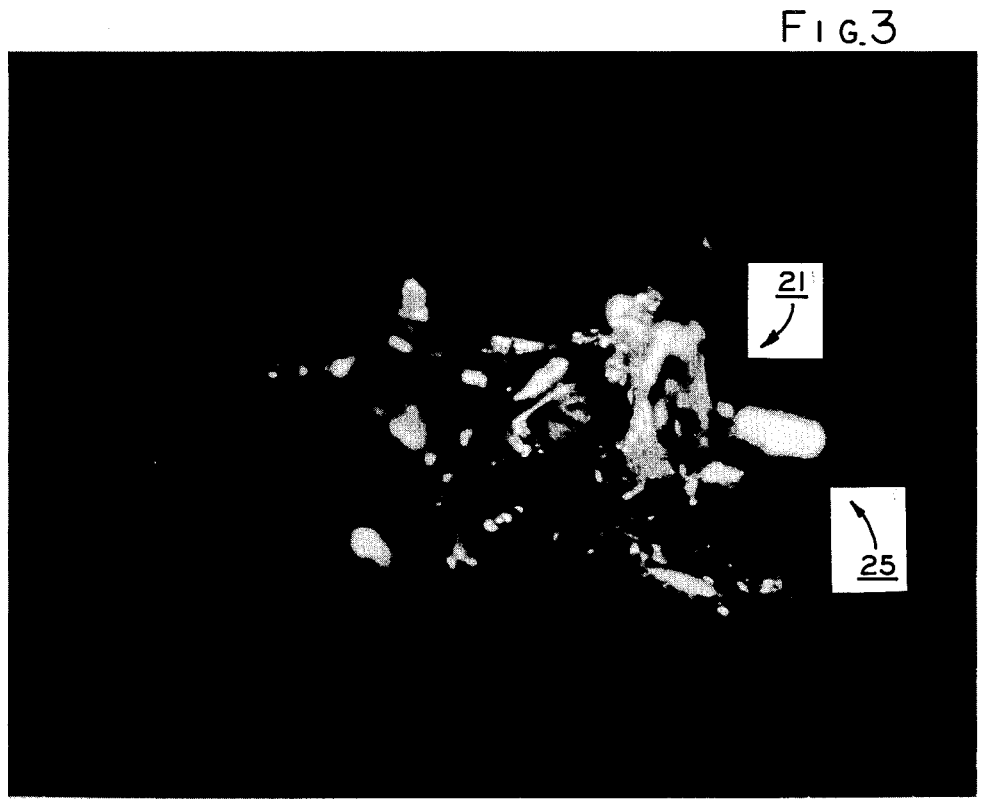
FIG. 3 is a photomicrograph of 40× magnification of a polymer foam particle similar to that of FIG. 2 and mixed with a liquid lubricant.
Figure 4:
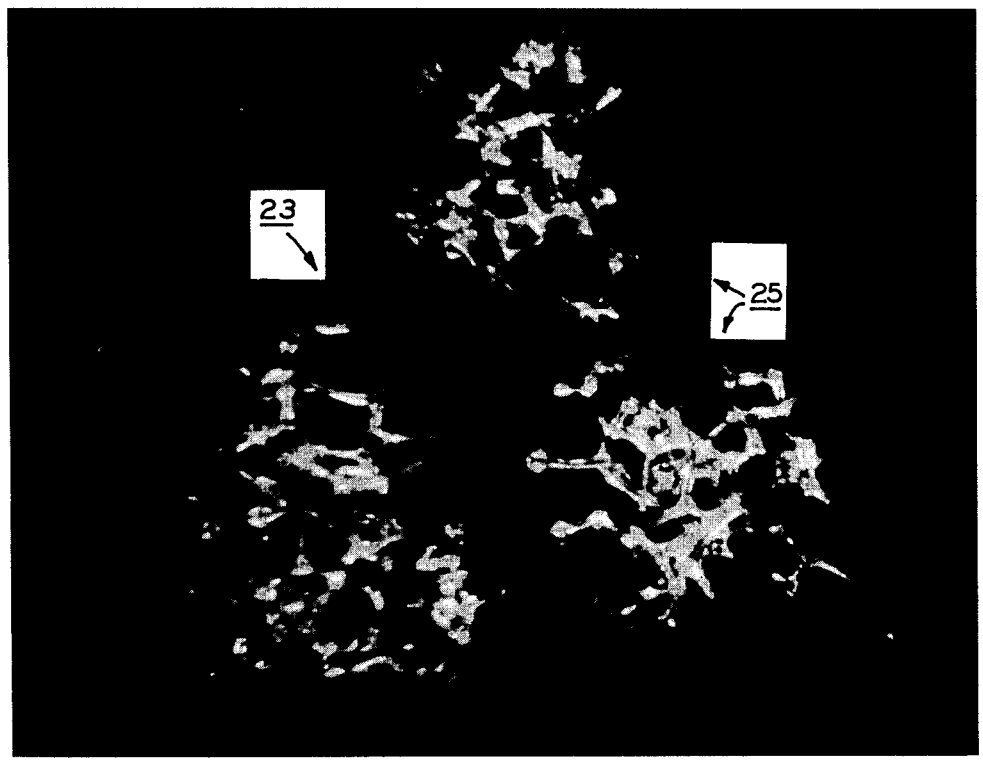
FIGS. 4 and 4a are photomicrographs of 20× magnification showing polymer foam particles having sizes of about 20 mesh and 35 mesh, respectively.
Figure 4A:
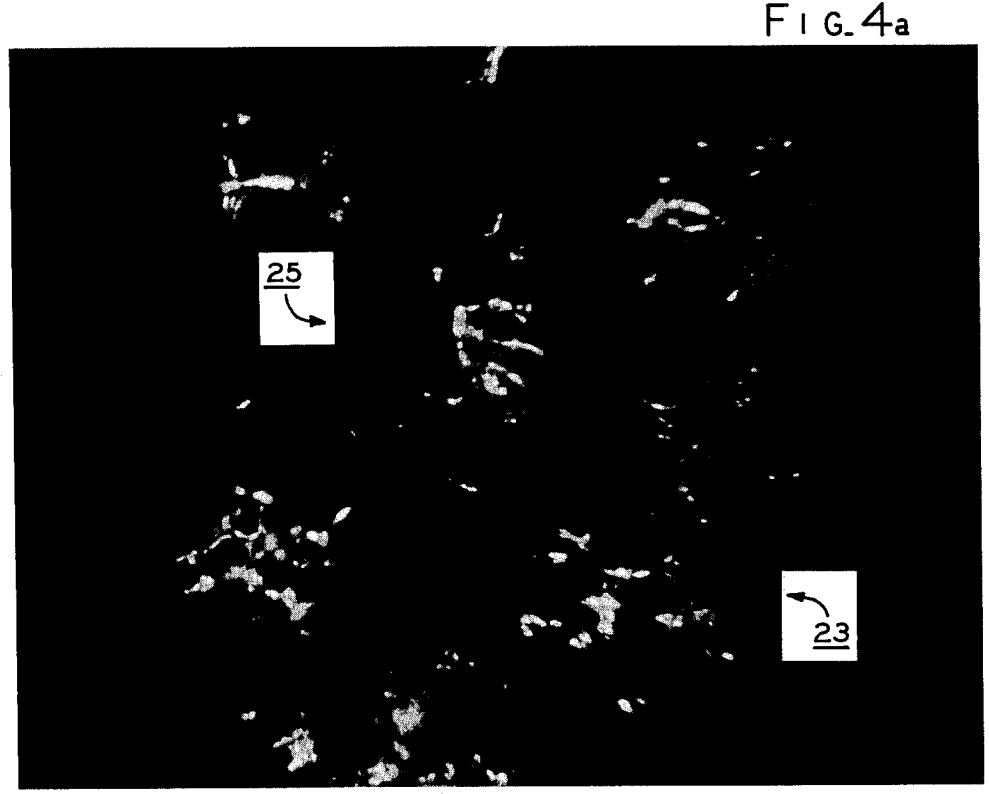
Figure 5:
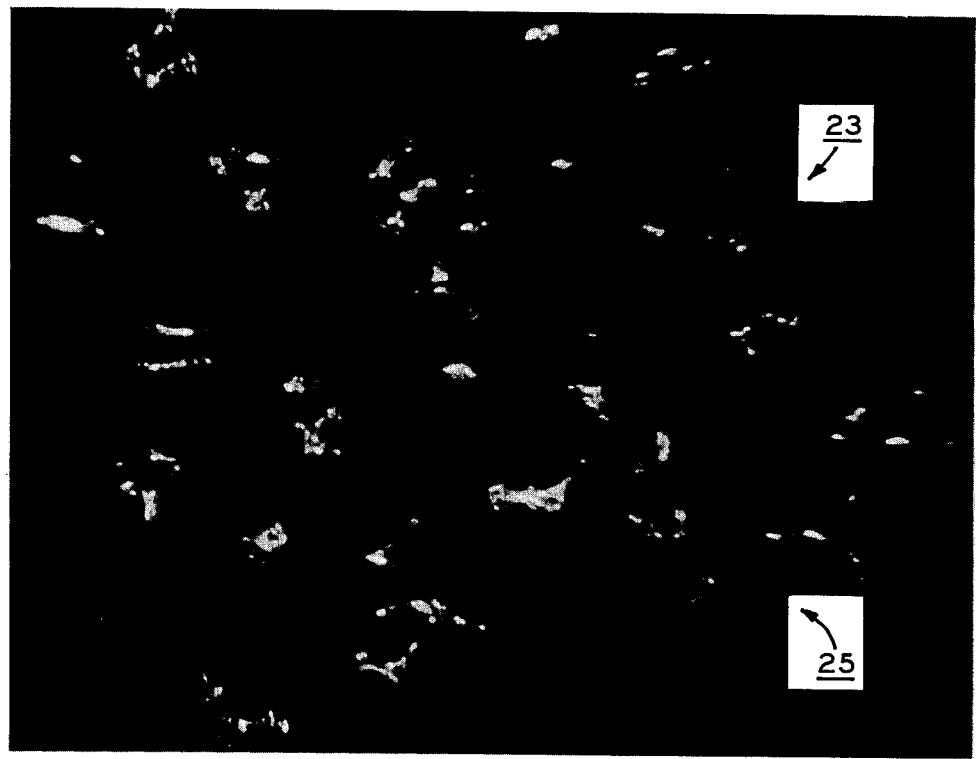
FIGS. 5 and 5a are photomicrographs of 20× magnification having sizes of about 60 mesh and 100 mesh, respectively.
Figure 5A:
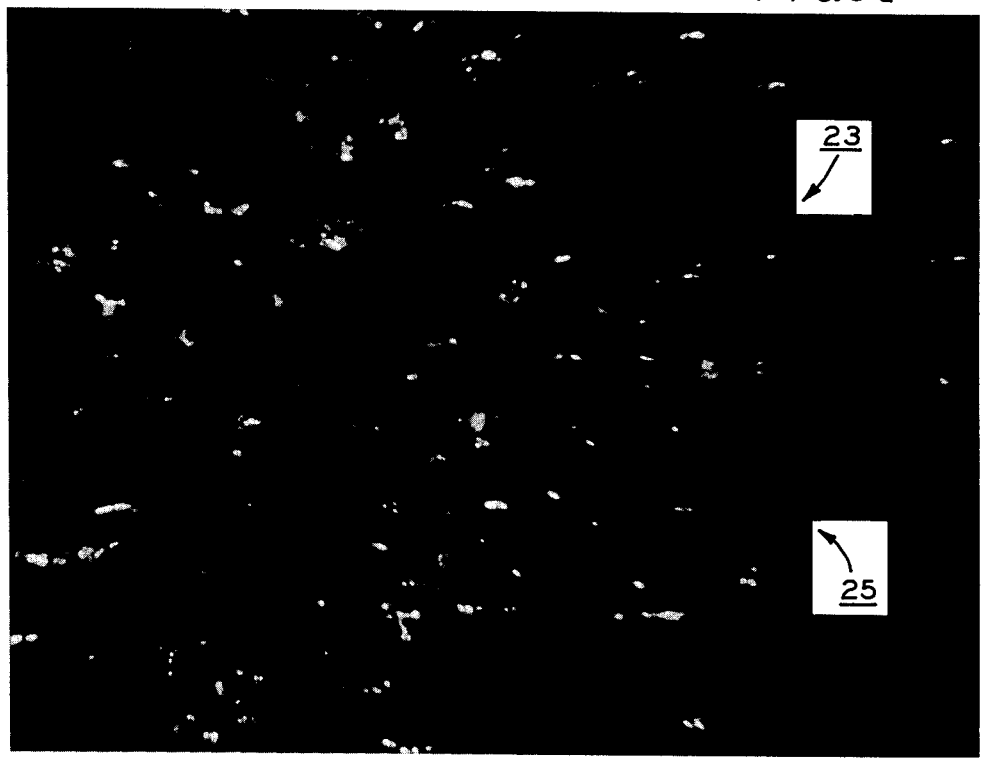

Referring now to FIGS. 2–4 in detail, particulate mass 23 is comprised of discrete, multi-digited, non-fibrous, resilient or resilient-type, synthetic polymer foam particles 25 which are substantially inert to and substantially insoluble in liquid lubricant 21 adapted to be carried thereby. Foam particles 22 are formed by first producing a polymer foam which is of a resilient, cellular structure, such as the widely known polyurethane foams of either the ester or ether types. The foamed resilient polymer is then comminuted or otherwise reduced to particle sizes preferably smaller than about 8-mesh, and more particularly to a particle size such that a major portion, such as a range of from about 65 to about 85% of particles 25, pass a 20-mesh screen and only about 2% to about 10% passes an 80-mesh screen.

Polymeric foam particles 25 are produced by fracturing the cellular structure, that is fracturing or rupturing both the cell ribs and the cell walls, of the foamed polymer, to produce the particulate mass 23 of discrete and highly irregular, branched or multi-digited, resilient or resilient-type, non-fibrous foam particles 25. Foam particles 25 not only have a large surface area being highly angular and irregular but also are generally multi-angled and multi-digited particles capable of physically retaining a high volume of liquid lubricant 21, such as a lubricating oil, as compared to the volume and weight of the particulate mass 23 itself.

Referring to FIGS. 2 and 3, the structure typical of foam particles 25, is shown greatly magnified for clarity. The highly irregular, multi-digited, non-fibrous, angular nature of foam particles 25 appears in the photomicrographs shown in FIGS. 2 and 3. In addition, it may also be noted that foam particles 25 alone and in conjunction with each other provide a highly voluminous, resilient, low density, wicking material capable of absorbing many times its weight in liquid lubricant 21, as may be seen in the photomicrographs of FIGS. 4 and 5.

Lubricant composition 22 may be formed by mixing or otherwise combining a mass of particulate non-fibrous, polymeric material, such as the discrete, non-fibrous, multi-digited, resilient foam particles 25, described above, with an appropriate liquid lubricant 21. While comminuting of the polymeric foam may be accomplished in a separate step, the foamed polymer may be flaked, cut or otherwise reduced into smaller pieces or particles, mixed with liquid lubricant 21, and then further comminuted to the desired particulate size, as described above, in an appropriate comminutor or other like apparatus (not shown).

Among the polymeric materials which have been utilized in lubrication system 11 are the widely known resilient polyurethane foams, of both the ester and the ether type. These foams are well known in the art and are widely available from a variety of commercial sources under the general designation of "polyurethane" foam. The principal characteristic of the polymeric foam, such as a polyurethane foam, for use in lubrication system 11 is that the foam be characterized as "resilient" as distinguished from "rigid" when in block or particulate form. As used herein, the terms distinguish between foam materials which give or yield to the touch and, when squeezed by hand, revert to substantially their original configuration, and the relatively rigid foam materials which crush or fracture when squeezed by hand do not revert to their original configuration after squeezing. The desired resilient or spongy foam materials retain their characteristic resilient feel after comminution or reduction to the desired particulate size, whereas rigid foam materials retain a brittle, non-resilient characteristic after comminution or granulation. It is believed that other polymeric foams having the desired characteristics of the above-discussed foam particles 25 may also be utilized in lubricating system 11, such as silicone foam commercially available from Dow-Corning Corporation of Midland, Michigan, or polypropylene foam commercially available from Haveg Industries, Inc. of Wilmington, Del., or polyethylene foam commercially available from Dow-Corning Company of Midland, Mich.

Liquid lubricant or lubricating oil 21 may be of any selected type, depending principally upon the use, operating conditions and atmospheric conditions in which the lubricant is to be utilized. For example, for many fractional horsepower motor applications, a liquid lubricant such as is described in U.S. Pat. No. 3,466,244 as a "280-oil" may be utilized. The oil 21 selected is mixed with particulate mass 23 of polymeric foam particles 25 produced by comminuting polymeric foam, as previously mentioned, thereby to form lubricant composition 22, and the foam particles are substantially or generally saturated with the oil. Foam particles 25 form about 20% by weight and liquid lubricant 21 forms about 80% by weight of lubricant composition 22. Lubricant composition 22 may then be extruded or packed into lubricant cavity 15 of apparatus 13, as previously described.

The following examples more particularly illustrate lubricant composition 22, and in the following Examples 1 and 2, the oil release characteristics of the lubricant composition are compared with the oil release characteristics of conventional wool felt oil wick utilized with the bearing structure. It should be understood that the examples are given by way of illustration and not by way of limitation.

EXAMPLE 1

An ester type polyurethane foam having approximately 60 pores per linear inch was comminuted until substantially all of the reduced particles thereof passed through a U.S. Standard Sieve series 5-mesh size screen, and a majority of the particles passed through a 20-mesh size screen. The resulting particulate polyurethane polymeric material mass was then thoroughly mixed with a "280" type lubricating oil, with the particulate polyurethane mass constituting about 30% by weight and the lubricating oil constituting about 70% by weight of the lubricant composition or mixture.

Figure 8:
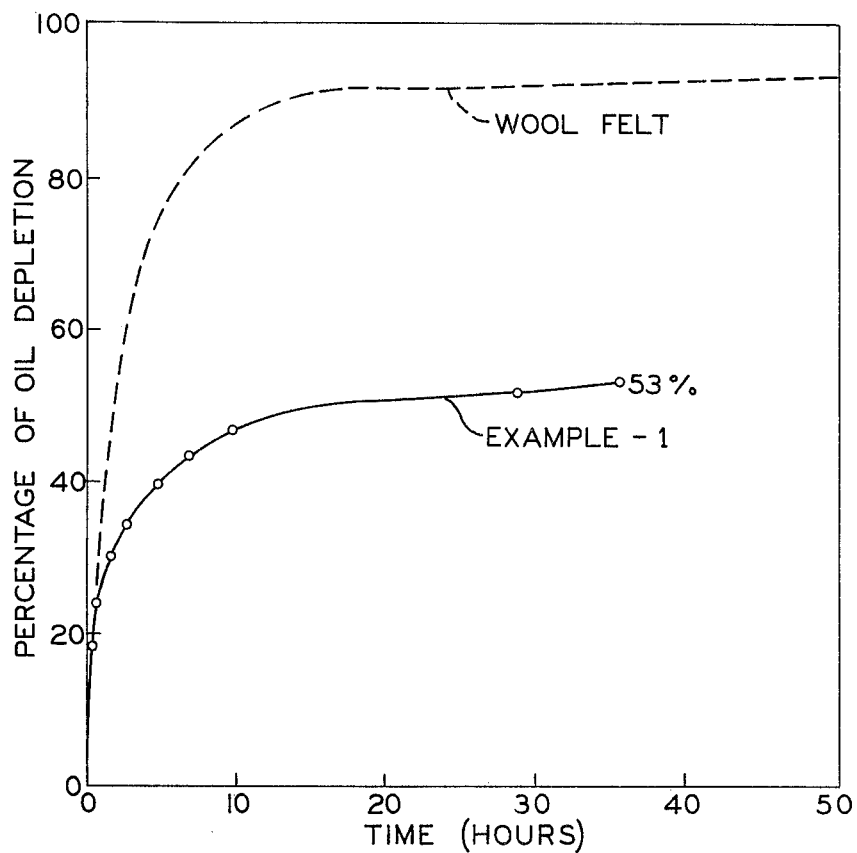
FIG. 8 is a graphic representation of the oil release characteristics of a lubricant composition of the lubrication system compared with the oil release characteristics of oil impregnated wool felt.

The lubricant impregnated wicking material thus prepared was then packed into a General Electric Company 39-Frame motor end shield 13, of the type shown in FIG. 1, but modified to prohibit oil from recirculating to the bearing cavity. Modified end shield 13 to be tested was mounted in a testing apparatus 41 of the type shown in FIG. 6, and a bearing load of 45 pounds was applied to shaft 31 outboard of bearing assembly 17. The bearing temperature was maintained at 70° C. An on/off cycle of 4.75 minutes "on" to 0.25 minutes "off" was applied. The test results were plotted and are shown in solid lines in FIG. 8. The results shown in FIG. 8 were compared to the oil release rate of the wool felt, as measured in a similar test utilizing wool felt storage wicking material, as shown in dotted lines in FIG. 8. With reference to FIG. 8, it may be seen that during the first few hours the oil impregnated wicking material of the invention released oil at an excellent rate, that is at a rate sufficiently high to ensure proper bearing lubrication, while not so high as either to cause overflow of oil within the motor, or to overstress the oil readsorption rate capacity of the wicking material. After 37 hours, 53% of the oil was found to have been released from the lubricant composition 22 using the novel wicking material 1. The circled points along the curve indicate actual test measurements upon which the curve is based.

Test apparatus 41 referred to above is a dynamometer test apparatus and is illustrated diagrammatically in FIG. 6. In test apparatus 41, General Electric 39-Frame motor end shield 13 of the type shown in FIG. 1 is mounted in a cradle bearing 43 supported on a base 45 and attached to a torque measuring transducer (not shown). Shaft 31 driven by a motor 47 is supported adjacent one end by end frame 13 and bearing 17 thereof and by a rear support bearing 49 intermediate cradle bearing 43 and drive motor 47. Shaft 31 extends through test bearing 17 of end shield 13 and supports at its outer end a load sustaining bearing 51 and a weight 53. Feeder wick 19, as shown in FIG. 1, is positioned above shaft 31 so that the weight 53, as shown in FIG. 7, is generally positioned approximately 180° from the feeder wick. Weight 53 may, however, be positioned at any other angular relationship with respect to feeder wick 19, depending upon the particular test conditions.

EXAMPLE 2

Figure 9:
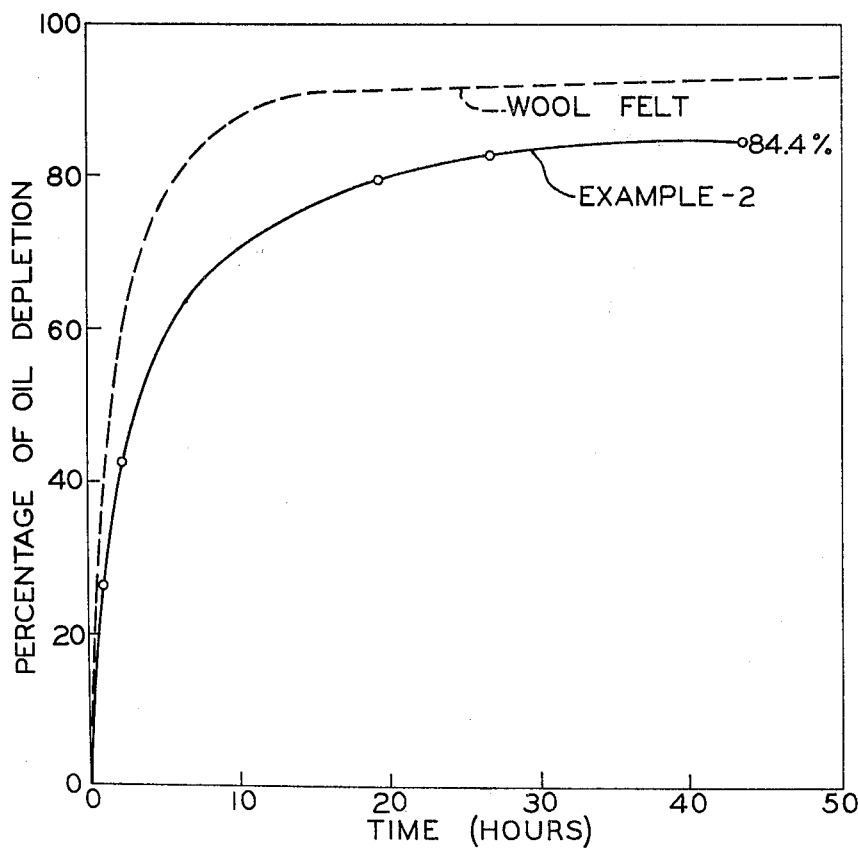
FIG. 9 is a graphic representation of oil release performance characteristics of oil impregnated felt compared with that of lubricant composition of the lubrication system.

An ether type resilient polyurethane foam was comminuted, as described in Example 1 and in the specification above, and the resulting mass of particulate polyurethane material was then thoroughly mixed with type 280 bearing lubricating oil to form a lubricant composition 22 containing about 20% by weight polyurethane particles and about 80% by weight lubricating oil. This lubricating oil impregnated lubricant composition 22 was then tested in another test apparatus 61 simulating usage of such lubricant composition when lubricating the bearing of a General Electric Company 39-Frame motor end shield 13. A schematic diagram of test apparatus 61 is shown in FIG. 7. Referring to FIG. 7, the test equipment or apparatus included a 5½ inch steel wheel 63 having a 1 inch wide peripheral rim. Wheel 63 was rotatably mounted on a frame 65. A pair of oil scrapers 67 were mounted on frame 65 to remove oil picked up by peripheral rim of wheel 63. A felt wiper 69 was mounted on frame 65 and positioned against the peripheral rim of wheel 63 to remove any remaining oil left by scrapers 67. A test sample of the lubricating oil impregnated lubricant composition 22 was placed in a test unit, indicated generally at 71. Test unit 71 includes a container or tube 73 having a volume which approximated that of lubricant reservoir 15 in the 39-Frame motor end shield 13 of the type shown in FIG. 1. A felt feeder wick 75 extended through the end cap of container 73 to the peripheral rim of wheel 63. The opposite end of container 73 was capped with an end cap perforated to permit air pressure within container 73 to be equalized with ambient air pressure. Aluminum heater coils 77 were wrapped about the exterior of container 73 and a thermocouple (not shown) was attached to control the temperature of the sample. With the test sample temperature maintained at 75° C., wheel 63 was rotated at a speed which, in connection with the area of feeder wick terminal surface, simulated a one-half inch shaft rotating at 1750 rpm in a 39-Frame motor end shield bearing. Oil loss versus time was determined by periodically weighing sample container 73. The results of the test are shown in FIG. 9, with the test result being shown in a solid line and compared with an all felt system as shown in dotted lines. The results of the all felt system were provided with the test apparatus shown in FIG. 7 using oil impregnated wool felt as the test packing material.

EXAMPLE 3

A polyether type polyurethane foam was purchased from United Foam Co., Breman, Ind. The foam was supplied as ½ inch flake. The input compositions for preparation of the foam were essentially 60% by weight polypropylene glycol, having a molecular weight of about 3000, and 40% toluene di-isocyanate, together with small amounts of appropriate catalysts, blowing agents and foam stabilizers. The foam was comminuted or otherwise reduced in an Abbe orbital granulator, the cutting chamber of which consisted of two rotating knives and two stationary knives. The comminuted foam was sieved through a number of screens and, for two separate comminuting or reducing operations, particle size distributions were obtained as shown in Table I:

TABLE I

| Sieve Size | Opening (inches) | % by wt. retained | |
|---|---|---|---|
| | | A | B |
| 5 | .157 | — | — |
| 8 | .09 | 0.1 | 1.0 |
| 20 | .03 | 24.0 | 34.0 |
| 80 | .007 | 69.0 | 63.0 |
| 200 | .003 | 7.0 | 2.0 |

Each measurement listed in Table I is an average of at least three determinations. By way of illustration, the 69.0% by weight retained means that 69% of the particles were smaller than 30 mils (passed through a sieve size 20-mesh), but were larger than 7 mils (were retained on sieve size 80-mesh).

The oil selected for use in the lubricating composition was a 280-type oil, and particular oils included Sun 280 oil, Mobil 280 oil, and Sun 280-NW (spermless) oil.

The lubricant composition, tested as hereinafter described, was prepared in the following manner:
1. 200 Parts by weight of polyurethane particles sized as described above in Table I were placed in a Hobart planetary mixer.
2. 800 Parts by weight of the selected 280-type oil was added to the mixer.
3. The mixture of oil and polyurethane particles was mixed for a period of twenty minutes.

The lubricating oil impregnated polymeric wicking material thus produced according to Example 3, referred to hereinafter as the Example 3 lubricant composition, was then used as a bearing lubricant and was also tested for a variety of significant properties. Among the properties tested were:
 Oil release
 Extrudability and oil retention
 Displacement of oil by water In connection with each of the above tests, the test results for the Example 3 lubricant composition were compared to the results of like tests performed on a commercially available lubricant composition or lubricating oil impregnated wicking material, such as "Permawick FHH", produced in accordance with the Permawick Company patents discussed above. The same lubricating oil, Sun Oil 280-NW, was the lubricant involved in each of the wicking materials. The commercial wicking material "Permawick FHH" was observed to be a celluosic, fibrous, wicking material containing 83 to 86% by weight Sun 280 oil, and 14 to 17% by weight fibrous wicking filler material.

In addition to the above mentioned properties, the Example 3 lubricant composition was compared to the Permawick FHH commercial material with respect to other properties deemed to be of less significance than those enumerated above, and was in each instance found to be comparable to the Permawick FHH material.

Figure 10:
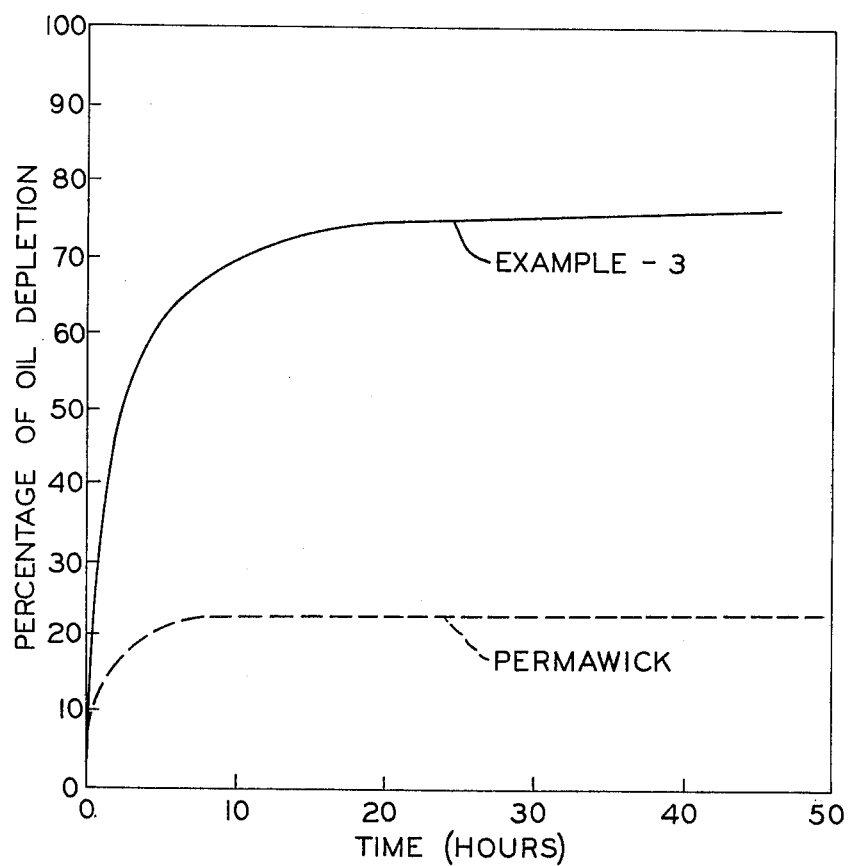
FIG. 10 is a graphic representation of oil release performance characteristics of the lubricant composition of the lubrication system compared with that of a commercially available lubricant composition.

The oil release characteristics of the Example 3 lubricant composition were obtained by utilizing the oil release testing apparatus shown in FIG. 7. Test container 73 containing the wicking material formulation was maintained at 75° C. and was weighed periodically to determine the amount of oil that was transferred to rotating wheel 63. The amount of available oil loss was then plotted as a function of time (FIG. 10). The ability of the Example 3 lubricant composition to release oil, as measured by the oil release tester, is further shown in FIG. 10, compared the similar oil release ability of Permawick FHH. Both samples were hand-packed and the test container 73 contained the same amount of material. It was observed that the Example 3 lubricant composition pumped 77% of available oil, while the Permawick FHH material pumped 23% of available oil.

Oil release data were also obtained from end shields 13 constructed as shown in FIG. 1 and having lubricant cavity 15 thereof packed with the Example 3 lubricant composition. For comparison, similar end shields 13 were packed with Permawick FHH lubricant material. In both cases, lubricant cavities 15 were packed by utilizing conventional commercial lubricant extrusion equipment. Packed end shields 13 were then mounted in the reaction dynamometer 41, shown diagrammatically in FIG. 6, with a load applied on shaft 31 outboard of bearing 17 of the packed end shield. The bearing temperature was maintained at 70° C. Shaft 31 was rotated at a speed of 1200 rpm, and cycled 4.75 minutes on and 0.25 minutes off. All loads were applied 180° from the window of bearing 17 and felt feeder wick 19. Bearings 17 were initially loaded at 45 pounds, and the load was only changed when "coaxing" more oil from the bearing. The direction of rotation (clockwise "CW" or counter clockwise "CCW") was also varied in order to coax more oil from bearings 17. As initially packed, the Permawick FHH packed end shields 13 contained 21.4 grams of lubricant (17.7 grams of oil) while the end shields 13 packed with the Example 3 lubricant composition contained 20.7 grams of lubricant (16.4 grams of oil). The comparative oil release data as obtained are tabulated in Tables II and III. It will be noted that the lubricant prepared according to the present invention released approximately 50% of available oil while the Permawick lubricated bearing released only approximately 34% of available oil.

TABLE II

OIL RELEASE ON 39 FRAME - MACHINE PACKED BEARINGS
PERMAWICK FHH WITH SUN OIL 280-NW

| Bearing No. 1 | | | | Bearing No. 2 | | | | Bearing No. 3 | | | |
|---|---|---|---|---|---|---|---|---|---|---|---|
| Time (hrs.) | Oil pumped (grams) | Load (lbs.) | Rotation | Time (hrs.) | Oil pumped (grams) | Load (lbs.) | Rotation | Time (hrs.) | Oil pumped (grams) | Load (lbs.) | Rotation |
| .25 | .526 | 45 | CCW | .25 | 1.008 | 45 | CW | .20 | .666 | 45 | CCW |
| .50 | .822 | | | .50 | 2.286 | | | .70 | 1.120 | | |
| 1.00 | 1.204 | | | .75 | 3.222 | | | 1.70 | 1.306 | | |
| 1.50 | 1.462 | | | 2.00 | 4.893 | | | 3.50 | 1.437 | | |
| 2.50 | 1.801 | | | 7.30 | 5.071 | | | 5.20 | 1.578 | | CW |
| 3.50 | 2.066 | | | 18.75 | 5.071 | | | 6.10 | 3.560 | | |
| 5.00 | 2.224 | | CW | 19.25 | 5.365 | | CW | 6.90 | 4.383 | | |
| 6.00 | 3.093 | | | 20.25 | 5.420 | | | 22.20 | 5.103 | | |
| 7.00 | 3.419 | | | 22.25 | 5.420 | | | 24.40 | 5.150 | | CCW |
| 8.00 | 3.442 | | CCW | 23.25 | 5.420 | | CW | 27.90 | 5.166 | 31 | CYC* |
| 23.50 | 3.470 | | CW | | | | | 29.10 | 5.565 | | |
| 25.00 | 3.727 | | | | | | | 30.80 | 5.915 | | |
| 26.00 | 3.738 | | | | | | | 46.10 | 6.336 | 27 | |
| 27.50 | 3.768 | | | | | | | 51.70 | 6.738 | | |
| 28.50 | 3.768 | | CW | | | | | 62.90 | 6.800 | | |
| 33.00 | 4.321 | 24 | CYC* | | | | | 66.70 | 6.964 | 15 | |
| 49.80 | 5.299 | | | | | | | 69.80 | 7.213 | | |
| 50.05 | 5.514 | 30 | CCW | | | | | 85.10 | 7.385 | | |
| 52.50 | 5.525 | | | | | | | 109.1 | 7.440 | 6 | |
| 53.50 | 5.525 | | | | | | | 137.8 | 7.440 | | |
| Total Oil Released = 31% | | | | Total Oil Released = 30% | | | | Total Oil Released = 41% | | | |

*CYC - direction of rotation changed every cycle (5 min.)

TABLE III

OIL RELEASE ON 39 FRAME - MACHINE PACKED BEARINGS
EXAMPLE 3 LUBRICANT COMPOSITION WITH SUN OIL 280-NW

| Bearing No. 1 | | | | Bearing No. 2 | | | | Bearing No. 3 | | | |
|---|---|---|---|---|---|---|---|---|---|---|---|
| Time (hrs.) | Oil pumped (grams) | Load (lbs.) | Rotation | Time (hrs.) | Oil pumped (grams) | Load (lbs.) | Rotation | Time (hrs.) | Oil pumped (grams) | Load (lbs.) | Rotation |
| .2 | .382 | 45 | CW | .1 | 1.374 | 45 | CCW | .1 | .273 | 45 | CCW |
| .4 | .383 | 45 | | .3 | 2.362 | | | .3 | .910 | | |
| 2.2 | .387 | 45 | | .5 | 2.870 | | | .6 | 1.598 | | |
| 3.0 | 1.289 | 30 | | .75 | 3.398 | | | 1.0 | 2.192 | | |
| 4.3 | 1.795 | 30 | | 1.00 | 3.772 | | | 1.5 | 2.703 | | |
| 5.8 | 2.024 | 30 | | 1.25 | 4.057 | | | 2.0 | 3.118 | | |
| 6.4 | 2.124 | 30 | | 1.50 | 4.318 | | | 2.6 | 3.408 | | |
| 6.9 | 3.345 | 45 | CCW | 1.75 | 4.547 | | | 7.6 | 3.946 | | |
| 7.9 | 4.779 | 45 | | 2.00 | 4.724 | | | 18.0 | 4.221 | | CW |
| 23.1 | 8.579 | 45 | | 2.85 | 5.085 | | | 19.0 | 4.977 | | |
| 28.3 | 8.677 | 45 | | 3.4 | 5.227 | | | 20.0 | 5.373 | | |
| | | | | 4.1 | 5.461 | | | 21.5 | 5.642 | | |
| | | | | 5.2 | 5.801 | | | 23.0 | 5.870 | | |
| | | | | 6.0 | 5.948 | | | 25.7 | 5.991 | | CCW |
| | | | | 6.8 | 6.057 | | | 26.5 | 6.023 | 30 | |
| | | | | 22.2 | 6.772 | | | 32.0 | 6.742 | | |
| | | | | 24.0 | 7.331 | | | 36.9 | 7.270 | | |
| | | | | 26.0 | 7.729 | | | | | | |
| | | | | 28.0 | 8.057 | | | | | | |
| | | | | 30.0 | 8.090 | | CW | | | | |
| | | | | 46.0 | 8.092 | | CCW | | | | |
| | | | | 50.0 | 8.542 | | | | | | |
| Total oil released = 52% | | | | Total oil released = 51% | | | | Total oil released = 44% | | | |

The extrudability and oil retention characteristics of the Example 3 lubricant composition were evaluated by determining if runoff or draining of oil occurred after the Example 3 lubricant composition was extruded. For this test, the Example 3 lubricant composition was extruded onto a screen, the extrudate and screen were placed over an aluminum dish, and the amount of oil that drained at 75° C and at room temperature was recorded. The test extrusion apparatus (not shown) consisted of two cylinders, the longer of which was 7 inches long with a ⅝ inch bore. The top of this cylinder was placed below and butted against another cylinder 3 inches long having a ¾ inch bore. Extrusion tests were thus made with metered flow from a large diameter to a small diameter in order to simulate the action of the commercially available lubricant wicking material extrusion machines. While only qualitative information was obtained, it was noted that the Example 3 lubricant composition had good integrity and had a uniform degree of wetness or oil distribution. In the screening tests, when the extrudate was placed on a screen at 75° C and at room temperature, there was no oil detected in the aluminum cups. Similarly, end shields 13 packed with the Example 3 lubricant composition under commercial extrusion conditions likewise did not lose oil when held in a oven, hub down, at 75° C. for 2 weeks.

The displacement of lubricating oil from the Example 3 lubricating composition, by water, was evaluated by immersion tests and wash-out tests. A simple immersion test was devised to determine the effect of water on the Example 3 lubricant composition. A comparison was made with the Permawick FHH material. Both materials utilized Sun Oil 280-NW lubricating oil. In the water displacement tests, both machine packed 39-Frame end shields 11 of the type shown in FIG. 1, as well as loose or uncompacted lubricant wicking materials, were tested. In each test, the amount of oil contained in the lubricant was determined after immersion in distilled water for a given time period. After immersion, the lubricant was heated at 75° C. until all water was removed. The difference between the original weight and the final weight was taken as a quantitative measure of the oil displaced.

In one form of the immersion test, approximately 20 grams of loose, uncompacted lubricant charged wicking material was weighed into a 250 cc beaker. A porous polyurethane plug was, in each case, inserted about half-way down the beaker to prevent the lubricant wicking material from floating. After inserting the plug, distilled water was added to the 200 cc mark. The beakers were maintained at room temperature at 50° C. for from one to 5 hours. The comparative test results for the Example 3 lubricant composition and the Permawick FHH lubricant compositions are presented in Table IV.

TABLE IV

COMPARISON OF EXAMPLE 3 LUBRICANT COMPOSITION AND PERMAWICK FHH WITH SUN OIL 280-NW RELATIVE TO OIL DISPLACEMENT BY WATER

| Sample | Wt. | Time (hours) | Temp. | % Oil Lost |
|---|---|---|---|---|
| Example 3 | 20.33 g. | 1 | 50° C | .89 |
| '' | 21.36 | 3 | 50° C | 1.04 |
| '' | 21.78 | 5 | 50° C | 1.51 |
| '' | 21.35 | 1 | 20° C | .99 |
| '' | 21.66 | 3 | 20° C | 1.35 |
| '' | 21.10 | 5 | 20° C | 1.38 |
| Permawick | 20.69 | 1 | 50° C | 8.0 |
| '' | 20.53 | 3 | 50° C | 14.6 |
| '' | 21.58 | 5 | 50° C | 21.0 |
| '' | 21.23 | 1 | 20° C | 34.6 |
| '' | 20.97 | 3 | 20° C | 44.3 |
| '' | 21.52 | 5 | 20° C | 42.5 |

Oil displacement comparisons were also made on the 39-Frame type end shields 13 as machine packed with the lubricant wicking materials. The packed end shields were immersed in water at 20° C. with the results shown in Table V.

TABLE V

| | Oil Displacement on 39-Frame End Shields | | | |
|---|---|---|---|---|
| | Oil Start | Oil Remaining after 7 hrs. | Oil Remaining after 40 hrs. | % Loss (40 hrs.) |
| Permawick FHH with Sun Oil 280-NW | 17.7 g. | 8.9 g. | 6.8 g. | 61% |
| Example 3 | 16.4 g. | 14.5 g. | 14.1 g. | 15% |

The water-washout characteristics of the Example 3 lubricant material were determined by dripping distilled water onto the top end of a bearing, while running, and collecting the oil and/or water overflowing the top of the oil well cover. For this purpose, 39-Frame type bearings 17 of the character shown in FIG. 1, with machine packed lubricant composition 22 were mounted on a shaft extension of a vertical 39-Frame type motor and positioned against a thrust collar pressed on the shaft extension (not shown). Bearings 17 were operated at 1600 rpm and maintained at a temperature of 50° ± 2° C., with a radial load of ten pounds opposite the feed wick. Distilled water was injected in bearing 17 with a hypodermic needle along side shaft 31 onto the outboard oil thrower 35, which had been pushed in as close to the bearing as possible. A Sage syringe pump with a 30 cc B & D syringe was used to control the water flow rate. A plastic tent was placed over the test setup and open dishes of water were inserted to increase humidity. Relative humidity was maintained between 60 and 76%. The test bearing and motor was tilted a few degrees so that overflow oil or water dropped to one side of the oil well cover, from which it was funneled into a graduate. Water flow rate was maintained at 4.5 cc per hour for an 18 cc total water flow. The test was conducted over a period of four hours. The collected overflow may be summarized as follows:

Example 3 — lubricant composition —4.0 cc oil, 8.5 cc water

Permawick lubricant composition — 7.5 cc oil, 6 cc water

The oil obtained from the Example 3 lubricant composition was more of an oil-water emulsion than was the oil from the Permawick packed bearing. In repeat tests, the difference noted above was not always as pronounced, although the relationship was always the same. An increase in temperature appeared to decrease the difference in oil extraction. Further investigation revealed that the rate of oil replacement by water in a bearing is greatly affected by the ease with which a path or channel for the water is developed through the packing. After such a path is established, water passes through quickly while oil replacement in adjacent areas proceeds at a slower pace. Tests in glass tubes showed that a water path is more quickly established in the comminuted foam material of the Example 3 lubricant composition than in the fibrous Permawick lubricant composition in which the water tends to spread out.

Lubricant compositions utilizing wicking materials of this invention, as above described are suitable for a wide variety of uses, in various apparatus, with particular emphasis on the lubrication of bearings of fractional horsepower motors. The lubricant composition may be used alone or in combination with a felt feeder wick. The lubricant composition is capable of feeding a major proportion of its retained lubricating oil or lubricant fluid to the bearing with which it is utilized. Moreover, the lubricant composition is highly suitable for use in automated manufacturing operations and, in particular, is suitable for use with extrusion machines of the type which are commercially utilized to inject lubricant compositions directly into bearing cavities of fractional horsepower motors during the manufacture thereof.

From the foregoing, it is now apparent that a novel lubrication system 1 for apparatus is provided meeting all of the objects and advantageous features set forth hereinabove, as well as others, and that changes in the lubricant composition utilized in the lubrication system and the arrangements, shapes and details of the component part of the apparatus may be made by those having ordinary skill in the art without departing from the spirit and scope of the invention, as set out in the claims which follow:

What I claim as new and desire to secure by Letters Patent of the United States is:

1. In a lubrication system for an apparatus having a bearing assembly in a lubricant cavity therefor; said lubrication system comprising means in said lubricant cavity for storing a liquid lubricant and for releasing it to effect a supply thereof to said bearing assembly, said storing and releasing means comprising a particulate mass of discrete, non-fibrous, multi-digited, resilient-type foam particles generally saturated with said liquid lubricant.

2. In a lubrication system for an apparatus, the apparatus having a lubricant cavity with a bearing assembly disposed therein and also having means for feeding a liquid lubricant supplied thereto to the bearing assembly with the feeding means disposed in the cavity in association with the bearing assembly; said lubrication system comprising means disposed within said lubricant cavity in interfacing relation with said feeding means for storing said liquid lubricant and releasing it to effect the supply thereof to said feeding means, said storing and releasing means comprising a particulate mass of discrete, non-fibrous, multi-digited, resilient-type foam particles generally saturated with said liquid lubricant.

3. The lubricating system as set forth in claim 2 wherein storing and releasing means has a capacity to release generally up to about 85% of said liquid lubricant stored therein to supply it to said feeding means.

4. The lubrication system as set forth in claim 2 wherein a major portion of said foam particles of said particulate mass are within a range size between approximately 20-mesh and approximately 80-mesh with the remaining foam particles of said particulate mass having sizes generally between about 5-mesh and about 200-mesh exclusively of the major portion size range.

5. The lubrication system as set forth in claim 2 wherein said foam particles have a particulate size of generally between about 5-mesh and about 200-mesh.

6. The lubrication system as set forth in claim 2 wherein said foam particles are polyurethane foam.

7. The lubrication system as set forth in claim 6 wherein said polyurethane foam is an ether type.

8. The lubrication system as set forth in claim 6 wherein said polyurethane foam is an ester type.

9. The lubrication system as set forth in claim 2 wherein said foam particles are a polymeric foam.

10. The lubrication system as set forth in claim 2 wherein said foam particles have a size in a range from approximately 8-mesh to approximately 80-mesh.

11. The lubrication system as set forth in claim 2 wherein a major portion of foam particles have a size smaller than approximately 20-mesh and larger than approximately 80-mesh.

12. The lubrication system as set forth in claim 2 wherein said foam particles are substantially inert to and insoluble in said liquid lubricant.

13. The lubrication system as set forth in claim 2 wherein a plurality of fractured cells of the cellular structure of said foam particles define the multi-digited characteristic thereof.

14. The lubrication system as set forth in claim 13 wherein said liquid lubricant is releasably retained by said foam particles generally in at least some portions of said fractured cells of the cellular structure thereof.

15. The lubrication system as set forth in claim 2 wherein said storing and supplying means contains approximately 20–30% by weight of said foam particles and approximately 70–80% by weight of the liquid lubricant.

16. In a lubrication system for an apparatus, the apparatus having a lubricant cavity with a bearing assembly therein adapted to journal a movable component of the apparatus and also having means for feeding a liquid lubricant supplied thereto to the bearing assembly and the movable component for lubricating it with the feeding means being disposed in the cavity in association with the bearing assembly and the movable component; the lubrication system comprising means adapted to be extruded into the cavity into interfacing relation with said feeding means for storing said liquid lubricant and releasing it to effect the supply thereof to feeding means, said storing and releasing means comprising a particulate mass of discrete, non-fibrous, multi-digited, resilient-type polymer foam particles generally saturated with said liquid lubricant and having a capacity for releasing generally up to about 85% of said liquid lubricant stored therein to supply it to said feeding means, and a major portion of said polymer foam particles of said particulate mass having a range size generally between approximately 20-mesh and approximately 80-mesh with the remaining polymer foam particles of said particulate mass having sizes generally between about 5-mesh and about 200-mesh exclusively of the major portion range size.

17. In a lubrication system for an apparatus, the apparatus having a bearing assembly in a lubricant cavity therefor, wicking means in the cavity for storage of a liquid lubricant, and a fibrous type lubricant feeder wick disposed in the cavity in interfacing and lubricant transferring relation with both the bearing assembly and the wicking means; the improvement wherein said wicking means comprises a mass of liquid lubricant impregnated discrete, non-fibrous, multi-digited, resilient foam particles having the capacity to transfer the liquid lubricant thereof to said feeder wick at a rate approximating that of said feeder wick so as to transfer said liquid lubricant to said bearing assembly.

18. The lubricating system as set forth in claim 1 wherein said storing and releasing means has a capacity to release generally up to about 85% of said liquid lubricant stored therein to supply it to said feeding means.

19. The lubrication system as set forth in claim 1 wherein a major portion of said foam particles of said particulate mass are within a range size between approximately 20-mesh and approximately 80-mesh with the remaining foam particles of said particulate mass having sizes generally between about 5-mesh and about 200-mesh exclusively of the major portion size range.

20. The lubrication system as set forth in claim 1 wherein said foam particles have a particulate size of generally between about 5-mesh and about 200-mesh.

21. The lubrication system as set forth in claim 1 wherein said foam particles are polyurethane foam.

22. The lubrication system as set forth in claim 21 wherein said polyurethane foam is an ether type.

23. The lubrication system as set forth in claim 21 wherein said polyurethane foam is an ester type.

24. The lubrication system as set forth in claim 1 wherein said foam particles are a polymeric foam.

25. The lubrication system as set forth in claim 1 wherein said foam particles have a size in a range from approximately 8-mesh to approximately 80-mesh.

26. The lubrication system as set forth in claim 1 wherein a major portion of said foam particles have a size smaller than approximately 20-mesh and larger than approximately 80-mesh.

27. The lubrication system as set forth in claim 1 wherein said foam particles are substantially inert to and insoluble in said liquid lubricant.

28. The lubrication system as set forth in claim 1 wherein a plurality of fractured cells of the cellular structure of said foam particles define said multi-digited characteristic thereof.

29. The lubrication system as set forth in claim 28 wherein said liquid lubricant is releasably retained by said foam particles generally in at least some portions of said fractured cells of the cellular structure thereof.

30. The lubrication system as set forth in claim 1 wherein said storing and supplying means contains approximately 20–30% by weight of said foam particles and approximately 70–80% by weight of said liquid lubricant.

* * * * *

UNITED STATES PATENT AND TRADEMARK OFFICE
CERTIFICATE OF CORRECTION

PATENT NO. : 4,008,788
DATED : February 22, 1977
INVENTOR(S) : James A. Whitt

It is certified that error appears in the above-identified patent and that said Letters Patent are hereby corrected as shown below:

```
Col.  1  line 37, after "1960" delete "," (comma);
         line 57, delete "Per-" and insert --"Per- --;
         line 58, delete "mawick" and insert --mawick"--.
Col.  2, line 54, delete "systems" and insert --system--.
Col.  3, line 20, after "thereto" insert --to--.
Col.  5, line 58, after "lubricant" insert --transferring--.

Col. 10, line 50, delete "on" and insert --"on"--; same line,
                  delete "off" and insert --"off"--.
Col. 14, line 14, delete "-" (dash) (first occurrence).
Col. 15, line 16, after "wherein" insert --said--;
         line 41, after "of" insert --said--;
         line 58, delete "the" and insert --said--.
Col. 16, line  3, after "to" (second occurrence) insert --said--.
```

Signed and Sealed this

Third Day of January 1978

[SEAL]

Attest:

RUTH C. MASON
*Attesting Officer*

LUTRELLE F. PARKER
*Acting Commissioner of Patents and Trademarks*